United States Patent Office.

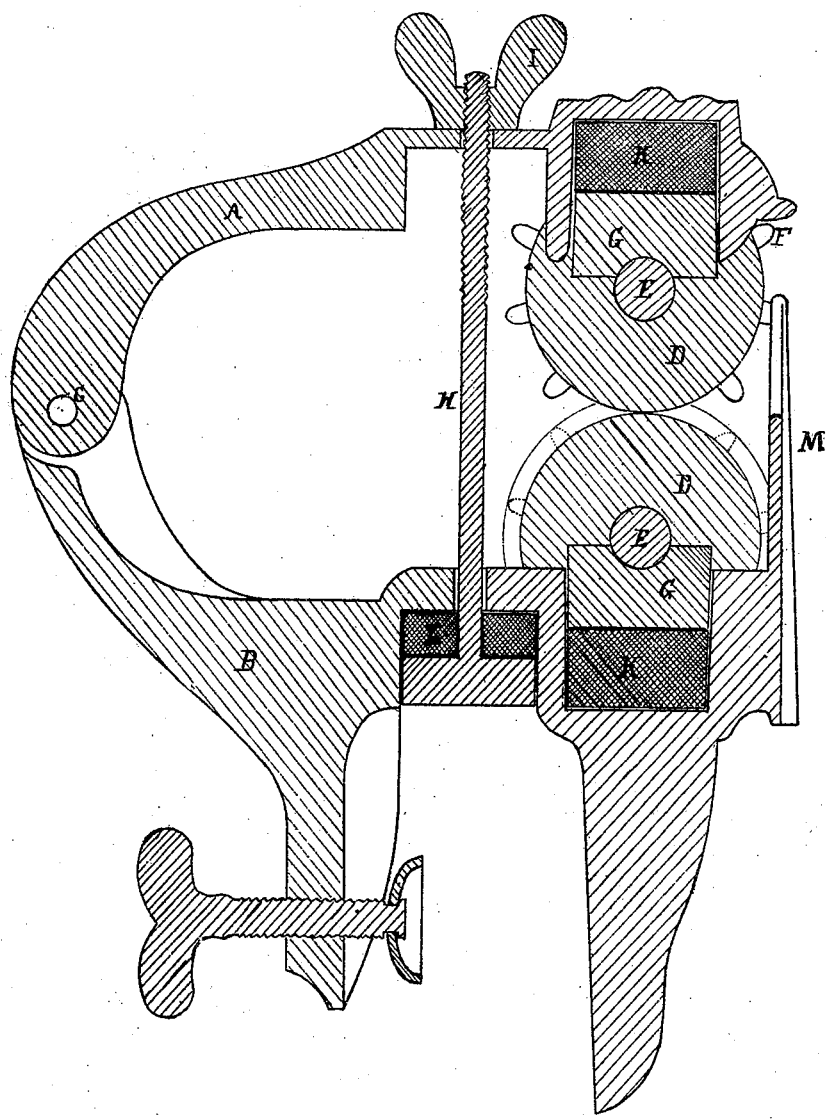

ALEXANDER KING, OF PHILADELPHIA, PENNSYLVANIA.

Letters Patent No. 112,815, dated March 21, 1871.

IMPROVEMENT IN CLOTHES-WRINGERS.

The Schedule referred to in these Letters Patent and making part of the same.

*To all whom it may concern:*

Be it known that I, ALEXANDER KING, of the city and county of Philadelphia, in the State of Pennsylvania, have invented a new and Improved Clothes-Wringer; and I do hereby declare the following to be a full, clear, and exact description thereof, which will enable any one skilled in the art to which it appertains to make and use my invention, reference being had to the accompanying drawing which forms a part of this specification, and which is—

A vertical transverse section of my improvement, taken through the middle of one of the hinges, and through the bearings of the wringer-rolls at the same end.

The wringer-frame is made in two parts, A and B, each constructed with chambers or recesses, as shown in the drawing, for the reception of the bearings G G and cushions K K.

The parts A and B are hinged together at C, and connected by one or more bolts, H.

D D are the wringer-rolls, to the shafts E E of which are attached the usual gear-wheels F F.

G G are the bearings of the shafts E E.

The bolt H is straight, and passes loosely through both parts of the frame, and is provided with a thumb-screw I, by means of which the pressure of the wringer-rolls upon each other may be adjusted.

The part B of the frame is also provided with guards M, to keep the clothes out of contact with the journals.

Between the frame and one or both of the bearings G G a cushion, K, of rubber or other elastic material, is interposed, so as to give one or both of the rolls an elastic bearing, and permit them to separate slightly when clothes are introduced between them, returning to their former position when the clothes have passed through.

A similar cushion, L, is also interposed between the frame B and the head of the bolt H. The purpose and operation of this device are the same as have been already described.

What I claim as my invention, and desire to secure by Letters Patent of the United States, is—

1. The arrangement of the parts A and B, hinged together at C, and connected by one or more straight, loose bolts H, provided with thumb-screws, as shown and described.

2. The arrangement of the parts A and B, provided with elastic bearings for the wringer-rolls, the guards M, and the bolt H, provided with elastic bearing.

ALEX. KING.

Witnesses:
 WM. R. WRIGHT,
 THOS. A. BURTT.